UNITED STATES PATENT OFFICE

BÉLA SPIEGL, OF BUDAPEST, HUNGARY

MANUFACTURE OF ALUMINA CEMENT

No Drawing. Application filed May 16, 1928, Serial No. 278,348, and in Austria October 15, 1927.

Alumina cement can be produced either by the melting of the raw mixture of lime or calcium oxide and ferruginous bauxite in an electrical or water jacket furnace, or by calcining the raw mixture; the calcining can be performed either at a temperature near to the melting point, in which case the calcined product is a black hard slag, or at temperatures well below the melting point, in which case the burned product shows different colours ranging from red to black; generally the higher the temperature the harder and darker the product.

Heretofore if the cement were to be produced by calcination, it was usual to grind the raw mixture very finely, so that it had less than 1% (generally only 0.4%) residue on a sieve having 900 meshes per sq. cm. and less than 10% residue on a sieve having 4900 meshes per sq. cm..

Hertzka (British Patent No. 265,494) has shown that while the coarse grinding of bauxite (for example down to 6–8% residue on a 900 mesh sieve) does not require more mechanical work than the grinding of a Portland cement raw mixture to the same grade, the fine grinding of most of the ferruginous bauxites (for example from 10% residue down to 0.2–1% residue on the 900 mesh sieve) requires at least twice as much mechanical work as the corresponding grinding of a Portland cement raw mixture.

The following table shows the times of grinding necessary to obtain the same grade flour from Portland and bauxite cement raw mixture.

| Minutes of grinding (total) | Portland | | Bauxite | |
|---|---|---|---|---|
| | Per cent residue on | | Per cent residue on | |
| | 900 sieve | 4900 sieve | 900 sieve | 4900 sieve |
| 0 | 25.– | 25.6 | 25.2 | 26.8 |
| 4 | 10.4 | 23.4 | 18.– | 26.6 |
| 10 | 3.7 | 21.2 | 10.2 | 24.4 |
| 22 | 0.4 | 10.2 | 4.0 | 21.6 |
| 55 | | | 0.4 | 10.4 |

It will be seen that the last stage of grinding, viz, from 3.7–4.0% residue down to 0.4% requires only 12 minutes (22–10) for Portland mixture, but 33 (55–22) minutes for bauxite mixture. Now in accordance with the invention, this grinding work of 33 minutes and more can be saved simply by prolonging the time of burning.

Hertzka has further ascertained that for obtaining the highest possible grade cement from a given raw mixture, it is not necessary to use the raw mixture in the finely ground state as was deemed necessary heretofore, as a coarsely ground raw mixture (for example one leaving 3–6% residue on the 900 mesh sieve and 15–25% on the 4900 mesh sieve) can be used as well, if only the duration of the burning is prolonged by an additional heating period, until a calcined sample taken from the kiln is up to the highest standards. A large number of careful experiments have shown, especially in the case of colloidal or semi-colloidal bauxites (like the South Europeans, in contradistinction to the French bauxites, which are mostly crystalline) that the caloric value of the fuel consumed during the additional heating period is materially less than the caloric value of the mechanical work required to grind a raw mixture of a fineness of say 6% residue on the 900 mesh sieve down to 0.4–1% residue, especially if the burning is performed in the well known annular kilns used for burning bricks and lime.

For example a raw mixture of bauxite and lime, ground so as to leave only 0.2% residue on the 900 mesh and 7% residue on the 4900 mesh sieve, gives a high grade alumina cement, if preheated within 12 hours up to 1200°, and then calcined at 1200° for 5 hours. The same high grade cement can be obtained at the same calcining temperature from a raw mixture leaving 4% residue on the 900 mesh and 18% residue on the 4900 mesh sieve, if the calcining period is prolonged up to 20 hours.

Accordingly, it is possible to reduce the production costs of bauxite cement without impairing its quality by using a coarser raw mixture and a longer calcining period than heretofore.

The degree of grinding of the raw material depends on the quality thereof and does not exceed 3% residue on the 900 mesh sieve. The duration of the burning period largely depends on the quality of the bauxite and the temperature of the kiln.

In the Hertzka process, as described above, it was not easy to ascertain with a given raw mixture the temperature and the duration of the burning which would give the highest possible grade of cement. Even if the best thermic conditions are ascertained by a series of experiments, deviations in the quality of the fuel, or in the humidity and temperature of the atmosphere may change materially the temperature of the kiln and consequently, the quality of the product. Such changes in the quality of the product generally can not be found out earlier than 48 hours after the calcined product has left the kiln, because the grinding and testing of the samples require at least 48 hours.

Now I have found that the colour of the calcined material is a sure means to ascertain the quality of the cement; the best cement will be obtained from any given bauxite with an iron oxide content of 5-15%, if the calcined—but not yet ground—material has a chocolate brown colour. If the colour has a reddish or black shade, the quality of the cement will be poorer. The degree of calcination corresponding to the chocolate brown colour can be reached at different calcination temperatures, each temperature requiring a corresponding specific duration of burning. Accordingly, if the best possible grade of cement is to be produced from a given raw mixture at a predetermined calcining temperature, the calcining is continued till a sample of the calcined material after cooling off shows a uniform chocolate brown colour. This colour test can be used advantageously for the regular control of the plant, and is a quick, simple and efficient means to detect and correct without loss of time even slight deviations from the standard grade caused by changes in the atmospheric conditions or in the fuel.

Having now particularly described and ascertained the nature of my said invention and in what manner the same is to be performed, I declare that what I claim is:—

A method of manufacturing alumina cement, comprising the steps of grinding a raw mixture of lime and bauxite, the latter having an iron content of 5-15%, to a fineness such that at least 3% of the mixture cannot pass through a 900 mesh sieve, and at least 15% cannot pass through a 4900 mesh sieve; and calcining the ground mixture, at a temperature at least 100° below the melting point, until it shows a chocolate-brown color.

In testimony whereof I affix my signature.

BÉLA SPIEGL.